(12) United States Patent
Birman et al.

(10) Patent No.: US 10,723,262 B1
(45) Date of Patent: Jul. 28, 2020

(54) LIGHT GUIDE FOR RING GAUGE ILLUMINATION

(71) Applicant: Continental Automotive Systems, Inc., Auburn Hills, MI (US)

(72) Inventors: Vyacheslav Birman, Auburn Hills, MI (US); Daniel P. Tollis, Novi, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/438,094

(22) Filed: Jun. 11, 2019

(51) Int. Cl.
  *B60Q 3/14* (2017.01)
  *B60K 37/02* (2006.01)
  *G01D 11/28* (2006.01)
  *F21V 8/00* (2006.01)

(52) U.S. Cl.
  CPC .............. *B60Q 3/14* (2017.02); *B60K 37/02* (2013.01); *G01D 11/28* (2013.01); *G02B 6/0036* (2013.01); *B60K 2370/336* (2019.05)

(58) Field of Classification Search
  CPC ................. G02B 6/0036; B60K 2370/336
  See application file for complete search history.

(56) References Cited

U.S. PATENT DOCUMENTS

| | | | | |
|---|---|---|---|---|
| 5,741,058 A * | 4/1998 | Suzuki | .................... | B60K 35/00 362/23.16 |
| 9,618,676 B2 * | 4/2017 | Sakanashi | ................ | B60N 3/10 |
| 9,937,849 B2 * | 4/2018 | Birman | ................... | G01D 11/28 |
| 10,060,590 B2 * | 8/2018 | Lee | ........................ | F21S 43/247 |
| 10,160,323 B2 * | 12/2018 | Lee | ............................ | B60Q 3/14 |
| 2004/0066659 A1 * | 4/2004 | Mezei | ..................... | G02B 6/001 362/555 |
| 2006/0171137 A1 * | 8/2006 | Tamaki | ................... | G01D 11/28 362/23.15 |
| 2006/0209525 A1 * | 9/2006 | Birman | ................... | B60K 37/02 362/23.11 |
| 2006/0285308 A1 * | 12/2006 | Birman | ................... | B60K 35/00 362/23.15 |
| 2011/0051393 A1 * | 3/2011 | Ishikawa | ................. | G01D 11/28 362/23.19 |
| 2011/0157899 A1 * | 6/2011 | Ko | ........................ | G02B 6/0061 362/307 |
| 2013/0114240 A1 * | 5/2013 | Makita | .................... | G01D 13/28 362/23.19 |
| 2015/0291092 A1 * | 10/2015 | Nirei | ....................... | G01D 11/28 362/511 |
| 2016/0229337 A1 * | 8/2016 | Birman | ................... | G02B 6/001 |
| 2018/0361920 A1 * | 12/2018 | Birman | ..................... | B60Q 3/12 |

* cited by examiner

*Primary Examiner* — Alexander K Garlen

(57) ABSTRACT

Uniform illumination is provided to a ring-shaped or round instrument panel guage by a light-conducting ring made the exterior surface of which is roughened. The ring is formed to have a light inlet tab that receives illuminating light from a bulb or LED. The ring can have any odd or even-number of light inlet tabs.

14 Claims, 4 Drawing Sheets

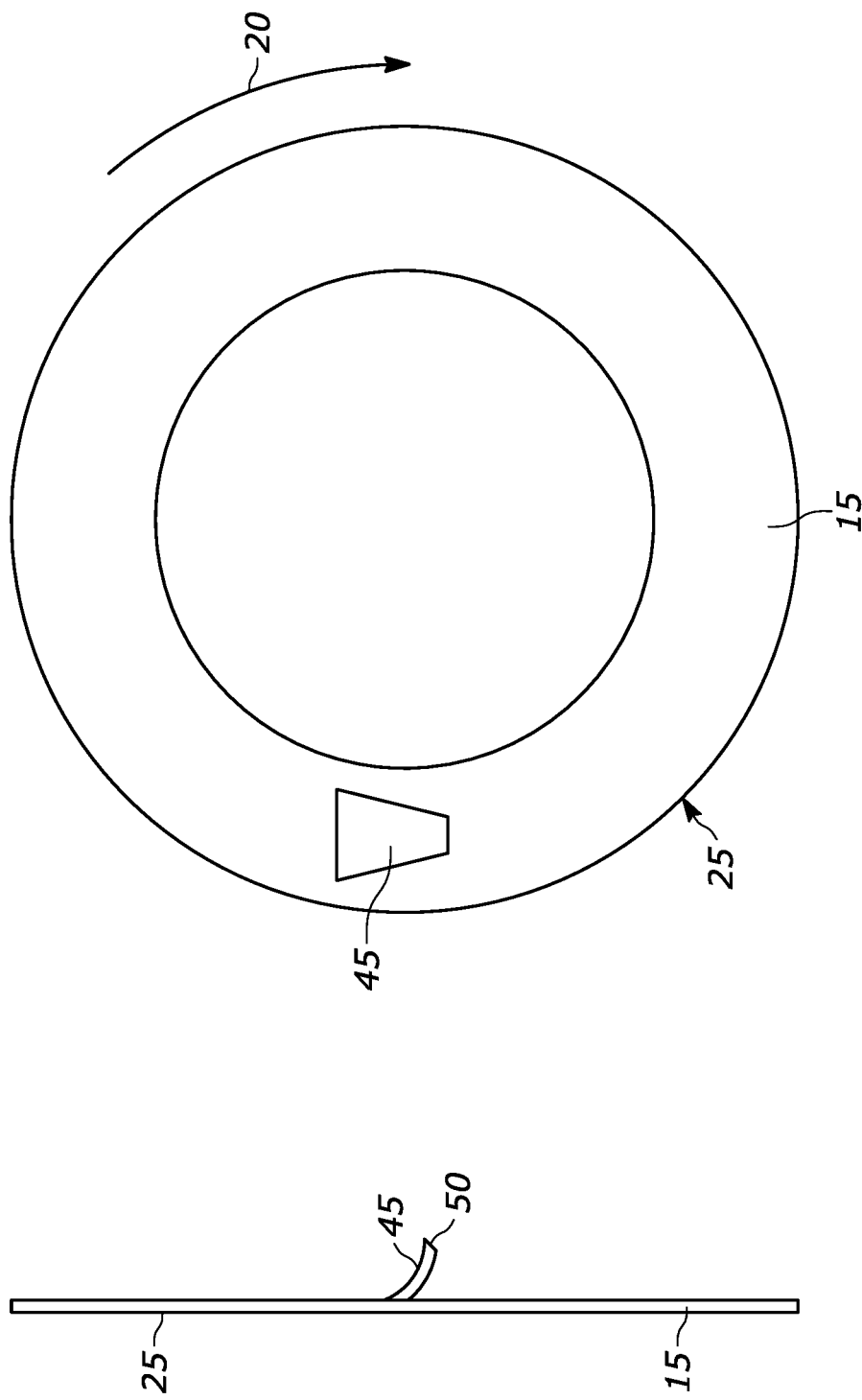

LIGHT GUIDE FOR RING GAUGE ILLUMINATION

Providing uniform or near-uniform illumination to a ring-shaped or circular gauge on a vehicle instrument panel or "dash board" is known to be somewhat problematic. While there are prior art devices that provide relatively uniform illumination, improvements to the prior art are always advantageous and desirable, especially when such improvements provide additional manufacturing flexibility, including for instance an ability to use different numbers of light sources.

BRIEF DESCRIPTION OF THE FIGURES

FIG. 3 is a side view of the device shown in FIG. 1;

FIG. 4 is a bottom view of the device shown in FIG. 1;

DETAILED DESCRIPTION

Figure 1:
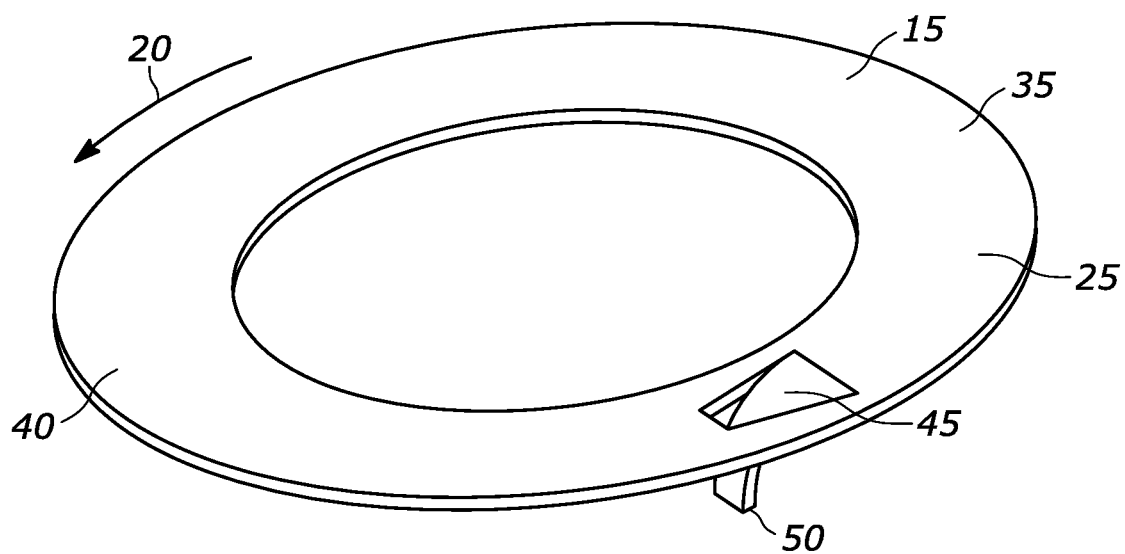
FIG. 1 is a perspective view of a light guide for ring gauge illumination.
Figure 2:
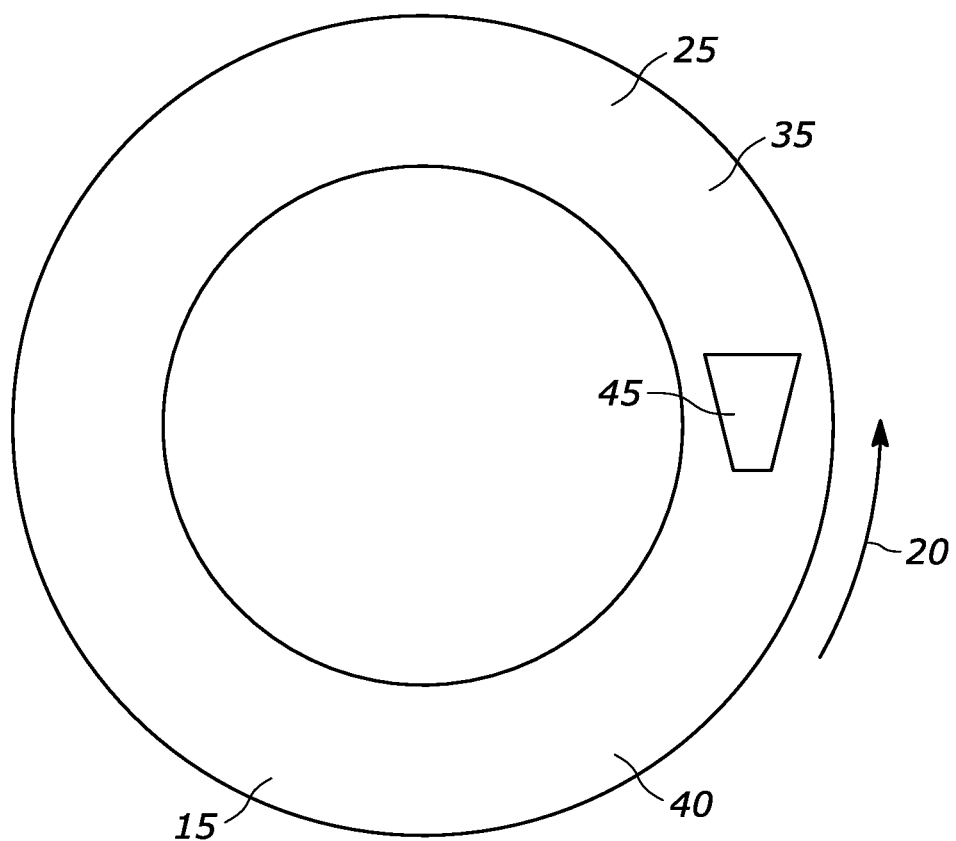
FIG. 2 is a top view of the device shown in FIG. 1.
Figure 5:
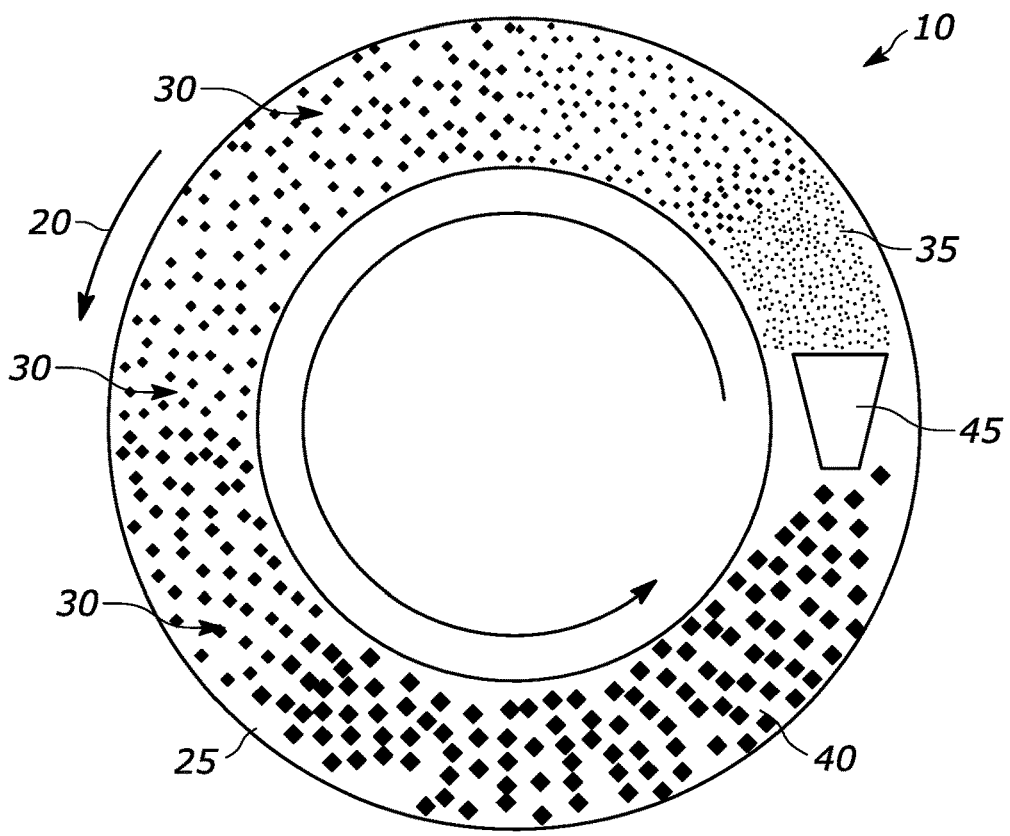
FIG. 5 is another top view showing how and where surface roughness varies around the light guide for a ring gauge shown in FIG. 1.

Put simply, the structure disclosed herein provides more-uniform illumination to ring-shaped as well as oval-shaped gauges or instruments on a vehicle instrument panel, using even or odd numbers of light sources. The ability to use virtually any number of light sources to illuminate a gauge can either reduce manufacturing costs or increase illumination depending on whether the number of light sources illuminating a gauge is reduced or increased.

Referring now to FIGS. 1-7, a light guide 10 for illuminating a ring-shaped or an oval-shaped instrument panel gauge is provided by a light-conducting ring 15, which is of course made of a light-conductive solid material that receives light from one or more sources. Light-conductive materials include plastics and glass and are well-known to those of ordinary skill in the art. A discussion of light-conducting materials is therefore omitted in the interest of brevity.

As used herein, a surface's "roughness" is considered to be an arithmetic average deviation from a center line of a surface's peaks and depressions when viewed from the surface's side, or RMS, which is the root mean square of the deviations from the center line of the surface where the surface center line is determined with respect to the highest or greatest average surface peak and lowest or deepest average surface depression. Roughness 30 on the exterior surface 25 of the light-guiding ring 15 shown in the figures determines the amount of light emitted from such a surface. A "rough" surface thus emits more light than does a "smooth" surface. Changing the relative roughness of the ring's surface thus changes the amount of light emitted from the surface of the ring from a constant-intensity light source. A localized roughness thus enables a correspondingly localized change in emitted light intensity.

A ring, annulet, toroid and an oval have a circumference 20. Circumference is considered to be the distance around the outermost exterior rim or edge 22 of either a ring, annulet, toroid or oval.

The ring 15 shown in the figures, which is an annulet, has an exterior surface 25 bounded by a circumferences 20. That surface 25 is provided a "roughness" 30 that varies in magnitude between about zero at a first location 35 on the circumference 20 up to about 400 micrometers at a second and different location 40 on the circumference 20. Stated another way, the surface roughness 30 of either a ring, annulet, toroid or oval, deliberately varies between a minimum value, e.g., zero and up to about 400 micrometers in order to vary the amount of light emitted around the circumference of the ring, annulet, toroid or oval that provides illumination to an instrument panel gauge using a constant-intensity light source whether it be an incandescent bulb or a light-emitting diode.

The first and second locations 35 and 40 on the annulet's roughened surface are where the annulet's surface is smoothest and its roughness is maximized respectively. In the figures, those two locations 35, 40 are essentially adjacent each other on the circumference 20. In alternate embodiments, however, locations where the surface roughness 30 is minimum and maximum can be located anywhere around the ring 10. In yet other embodiments, the ring 10 has more than one location where roughness is minimum and more than one location where roughness is a maximum thereby providing multiple locations around the ring 10 where emitted light is minimized and maximized.

Figure 6:
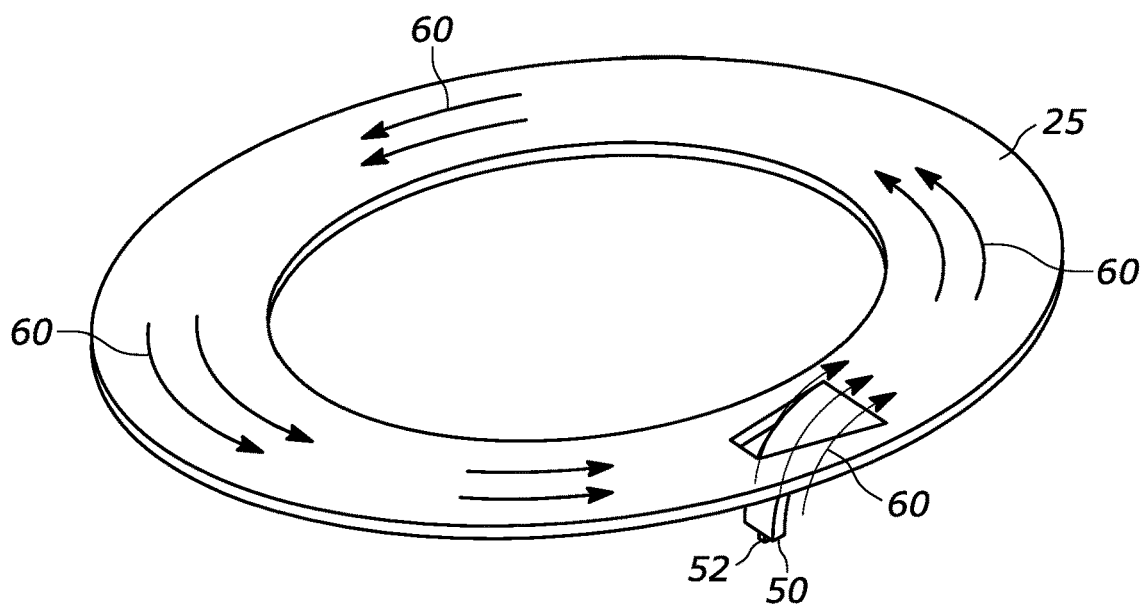
FIG. 6 depicts the transmission of light into the light guide and the transmission of light around the light guide.

Visible light is "injected" into the light-conductive ring 15 through at least one light inlet tab 45. Such a tab 45 is best seen in FIGS. 1, 3 and 6. As noted above, the ring 15 can have one tab 45, two tabs 45, three tabs 45 or virtually any other number of light inlet tabs 45. The preferred embodiment of a light inlet tab 45, best seen in FIG. 1, has an overall shape reminiscent of a curved trapezoid. The light inlet tab 45 extends "downwardly" or "away" from the exterior surface 25 of the light-conducting ring 15 that is "roughened."

The light inlet tab 45 has an open end 50. The open end 50, best seen in FIG. 3, is considered herein as being spatially separated from or "away" from the exterior surface 25 of the ring 15 in order to allow the tab 45 to meet and receive light from a light source 52. The light inlet tab 45 is thus "configured" or "sized, shaped and arranged" to receive visible light from a light source. The light source 52 should of course be located as close as possible to the open end 50 in order to maximize the amount of light coupled into the ring 15. The light source 52 is preferably a light emitting diode but could also be an incandescent bulb. In FIG. 6, an LED 52 is "proximate" the open end 50 of the light inlet tab 45.

Those of ordinary skill in the art should appreciate that in order for light transmission into the ring 15 to be maximized, the light-conducting ring 15 and the tab 45 are preferably a unitary structure, i.e., they are formed at the same time from the same light-conductive material. As best seen in FIG. 6, light 60 introduced into the open end 50 of the light inlet tab 45 will propagate through the tab 45 toward and into the ring 15 where it will propagate around the interior of the ring 15.

Figure 7:
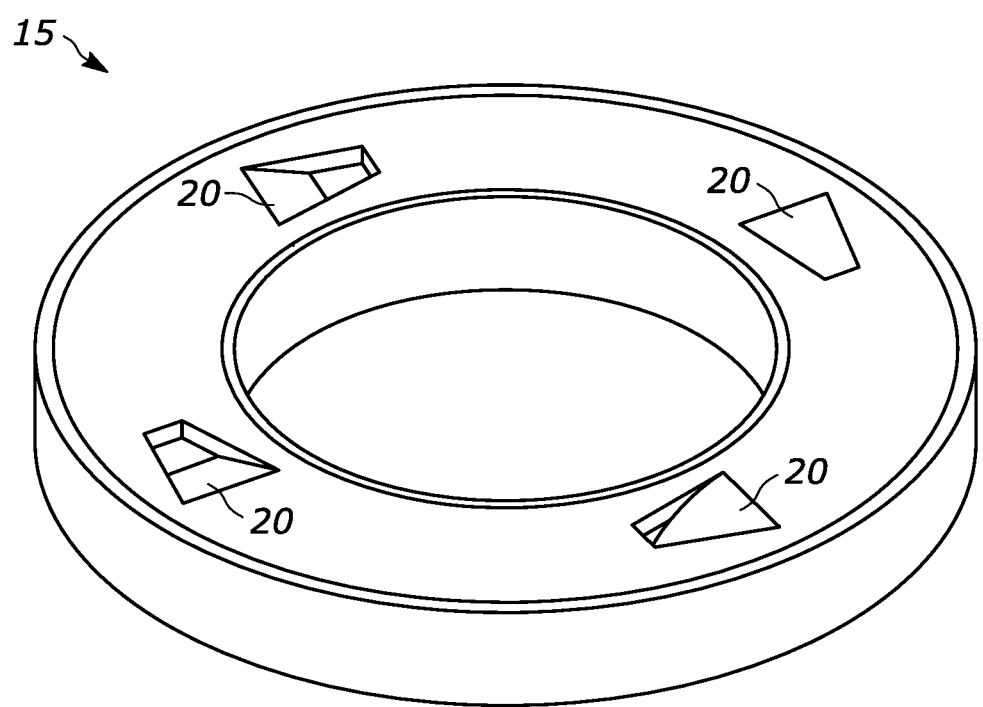
FIG. 7 depicts a light guide having multiple light-injection tabs, spaced around the circumferences of the ring.

As noted above, the light guide 10 does not require any particular number of light sources 52. As best seen in FIG. 7, a circular, light-conducting ring 15 has multiple light-inlet tabs 45. The light-conducting ring can have an even or odd number of tabs 45 spaced at regular or irregular intervals around the circumference of the ring 15.

As noted above, the preferred embodiment of the ring is annulet shaped. In an alternate embodiment, the ring 15 is toroid-shaped.

The foregoing is for purposes of illustration. The true scope of the invention is set forth in the following claims.

What is claimed is:

1. A light guide for illuminating a ring-shaped gauge, the light guide comprising:
    a light-conducting ring made of a light-conductive material, the ring having an outer circumference, an inner circumference spaced and an exterior surface within a radial distance between the outer circumference and the inner circumference, the exterior surface having a roughness that varies in magnitude between first and second locations around the circumference; and
    a light inlet tab extending away from the exterior surface of the light-conducting ring and that is disposed within the radial distance between the outer circumference and the inner circumference, the light inlet tab having an open end that is away from the exterior surface, the light inlet tab being sized, shaped and arranged to receive visible light from a light source that is proximate the open end, the light inlet tab and the light-conducting ring being a unitary structure, formed from the same light-conductive material, wherein light introduced into the open end of the light inlet tab will propagate through the tab toward and into the ring and propagate around the interior of the ring, wherein the outer circumference defines a full, uninterrupted 360 degree outer edge, the inner circumference defines a full, uninterrupted 360 degree inner edge and the exterior surface is bounded radially between the outer edge and the inner edge.

2. The light guide of claim 1, wherein the exterior surface roughness varies between about zero up to about four hundred micrometers.

3. The light guide of claim 2, wherein the exterior surface roughness variation is continuous between the first and second locations.

4. The light guide of claim 2, wherein the exterior surface roughness variation is discontinuous between the first and second locations.

5. The light guide of claim 2, wherein the light-conductive ring is toroid-shaped.

6. The light guide of claim 2, further comprising a plurality of light inlet tabs, which are separated from each other around the circumference and wherein each light inlet tab receive light from a corresponding light source.

7. The light guide of claim 6, wherein the light inlet tabs of the plurality of light inlet tabs are spaced substantially evenly around the first circumference.

8. The light guide of claim 7, wherein the number of light inlet tabs is an odd number.

9. The light guide of claim 1, wherein the light inlet tab is disposed between the outer edge and the inner edge.

10. The light guide of claim 9, wherein the surface roughness is disposed uniformly in a radial direction beginning from the inner edge and extending to the outer edge.

11. The light guide of claim 10, wherein the surface roughness increases in a circumferential direction away from light inlet tab.

12. The light guide of claim 11, wherein the surface roughness is uniform radially between the inner edge and the outer edge.

13. A light guide for illuminating a ring-shaped gauge, the light guide comprising:
    a light-conducting ring having a continuous outer circumference, an inner circumference spaced radially apart from the outer circumference and an exterior surface bounded radially between the outer circumference an the inner circumference, the exterior surface having a roughness that is uniform radially between the inner circumference and the outer circumference and increases in a circumferential direction; and
    a light inlet tab formed from the light-conducting ring and extending away from the exterior surface of the light-conducting ring and disposed within a radial distance between the outer circumference and the inner circumference, the light inlet tab having an open end spaced for receiving visible light that will propagate through the light inlet tab and into the light-conducting ring, wherein the outer circumference defines a full, uninterrupted 360 degree outer edge, the inner circumference defines a full, uninterrupted 360 degree inner edge and the exterior surface is bounded radially between the outer edge and the inner edge.

14. The light guide of claim 13, wherein the surface roughness increases in a circumferential direction away from light inlet tab.

* * * * *